United States Patent [19]

Okano

[11] Patent Number: 4,668,740

[45] Date of Patent: May 26, 1987

[54] VINYL CHLORIDE POLYMER RESIN COMPOSITION

[75] Inventor: Kenji Okano, Yokohama, Japan

[73] Assignee: Mitsubishi Rayon Company, Ltd., Tokyo, Japan

[21] Appl. No.: 723,278

[22] Filed: Apr. 15, 1985

[30] Foreign Application Priority Data

Apr. 23, 1984 [JP] Japan ................................. 59-81553

[51] Int. Cl.$^4$ ........................ C08L 27/06; C08L 33/12
[52] U.S. Cl. .................................... 525/227; 525/238; 525/239
[58] Field of Search ................................ 525/227, 239

[56] References Cited

U.S. PATENT DOCUMENTS

| | | | |
|---|---|---|---|
| 3,251,904 | 5/1966 | Souder et al. | 525/227 |
| 3,301,919 | 1/1967 | Cenci et al. | |
| 3,373,229 | 3/1968 | Philpot et al. | 260/899 |
| 3,673,283 | 6/1972 | Tanaka et al. | 260/898 |
| 3,956,251 | 5/1976 | Feiler et al. | 525/239 |
| 4,247,663 | 1/1981 | Yoshiga et al. | 525/227 |
| 4,267,084 | 5/1981 | Mizutani et al. | 525/227 |
| 4,408,015 | 10/1983 | Flatau | 525/227 |
| 4,503,123 | 3/1985 | Ou-Yang | 525/227 |

FOREIGN PATENT DOCUMENTS

| | | | |
|---|---|---|---|
| 2014851 | 10/1971 | Fed. Rep. of Germany. | |
| 376978 | 7/1962 | Japan | 525/239 |
| 40-5311 | 3/1966 | Japan. | |
| 57-074347 | 5/1982 | Japan | 525/227 |
| 981116 | 1/1965 | United Kingdom | 525/227 |
| 2017111 | 3/1979 | United Kingdom. | |

Primary Examiner—Carman J. Seccuro
Attorney, Agent, or Firm—Oblon, Fisher, Spivak, McClelland & Maier

[57] ABSTRACT

A vinyl chloride polymer resin composition having excellent processability and flowability is comprised of (A) 100 weight parts of a vinyl chloride polymer composition comprising 5 to 100 weight % of a vinyl chloride polymer having an average polymerization degree of 300 to 700 and 95 to 0 weight % of a vinyl chloride polymer having an average molecular weight higher than 700, and (B) 0.1 to 30 weight parts of a methyl methacrylate polymer comprised of at least 40 weight % of methyl methacrylate and having a reduced viscosity ($\eta$sp/C) of 0.1 to 2 l/g.

6 Claims, No Drawings

VINYL CHLORIDE POLYMER RESIN COMPOSITION

BACKGROUND OF THE INVENTION (1) Field of the Invention

The present invention relates to a vinyl chloride polymer resin composition having excellent processability and flowability, which comprises a vinyl chloride polymer having a low degree of polymerization.

(2) Description of the Related Art

A vinyl chloride polymer resin has excellent chemical and physical properties but, as is well known, this resin has poor heat stability, impact resistance and processability. Various methods have been proposed for overcoming these defects. More specifically, various heat stabilizers have been developed for improving the heat stability and various impact modifiers have been developed for improving the impact resistance. These additives have been used by incorporation into vinyl chloride polymer resins. As an agent for improving the processability, there has been proposed a high-molecular weight acrylic polymer processing aid. Namely, the incorporation of a small amount of this processing aid in a vinyl chloride polymer resin can improve the processability of the vinyl chloride polymer resin, for such processes as calendering, vacuum forming or injection molding (refer to Japanese Examined Patent Publication No. 40-5311).

Where a vinyl chloride polymer resin composition is prepared by incorporating this high-molecular weight acrylic polymer processing aid into a commercially available vinyl chloride polymer resin having a high degree of polymerization, the melt viscosity is drastically increased, even though the amount of the processing aid added is small, and the kneading lead in a molding machine is extremely increased. Moreover, since the resin molding temperature must be elevated, the resin is thermally degraded and it is difficult to continue the processing for a long time. The above problem becomes prominent, especially when the processing temperature is high and the processing is performed at a high speed. As means for overcoming this disadvantage, there may be considered a method for improving the flowability by adding a liquid substance such as a plasticizer, but here reduction of the physical properties and processability cannot be avoided.

Also in the field of vinyl chloride polymer resins having a low degree of polymerization, development of a product having a good processability is desired but a satisfactory product has not been developed.

SUMMARY OF THE INVENTION

Under this background, we carried out research with a view to developing a vinyl chloride polymer resin having a low degree of polymerization excellent in processability and flowability. As a result, it has been found that if a methyl methacrylate polymer having a specific reduced viscosity ($\eta$sp/C) is incorporated into a vinyl chloride polymer having a specific degree of polymerization, a good flowability can be given to the resulting resin composition and various processability characteristics for such processes as calendering, blow molding, vacuum forming injection molding and low-expansion molding can be improved while retaining the inherent good chemical and physical properties of the vinyl chloride polymer, and further, that even if a vinyl chloride polymer having a high degree of polymerization is incorporated in an amount below a specific level into this polymer resin composition, a good vinyl chloride polymer resin compsition can also be obtained.

It is a primary object of the present invention to provide a vinyl chloride polymer resin composition having an excellent processability and flowability, comprising a vinyl chloride polymer having a low degree of polymerization.

In accordance with the present invention, there is provided a vinyl chloride polymer resin composition having an excellent processability and flowability, which comprises (A) 100 parts by weight of a vinyl chloride polymer composition comprising 5 to 100% by weight of a vinyl chloride polymer comprised of at least 80% by weight of vinyl chloride units and having an average polymerization degree of 300 to 700 and 95 to 0% by weight of a vinyl chloride polymer comprised of at least 80% by weight of vinyl chloride units and having an average polymerization degree higher than 700, and (B) 0.1 to 30 parts by weight of a methyl methacrylate polymer comprised of at least 40% by weight of methyl methacrylate units and having a reduced viscosity ($\eta$sp/C) of 0.1 to 2 l/g as measured at 25° C. with respect to a solution of 0.1 g of the polymer dissolved in 100 ml of chloroform.

DESCRIPTION OF THE PREFERRED EMBODIMENTS

The vinyl chloride polymers used in the present invention have a vinyl chloride unit content of at least 80% by weight, and include a homopolymer of vinyl chloride, a copolymer of vinyl chloride with other vinyl monomer copolymerizable therewith and a mixture thereof. The vinyl chloride polymer composition comprises 5 to 100% by weight of a vinyl chloride polymer having an average polymerization degree of 300 to 700 and 95 to 0% by weight of a vinyl chloride polymer having an average polymerization degree higher than 700.

In accordance with one preferred embodiment of the present invention, the vinyl chloride polymer composition consists of a homopolymer of vinyl chloride having an average polymerization degree of 400 to 500, or consists of 80 to 20% by weight of a homoplymer of vinyl chloride having an average polymerization degree of 400 to 500 and 20 to 80% by weight of a homopolymer of vinyl chloride having an average polymerization degree of 800 to 1000.

The vinyl monomer copolymerizable with vinyl chloride may be copolymerized in an amount of up to 20% by weight. Specific examples of the vinyl monomer are ethylene, propylene, vinyl acetate and alkylvinyl ethers.

In the present invention, if the amount of the vinyl monomer copolymerizable with vinyl chloride exceeds 20% by weight or a vinyl chloride polymer having an average polymerization degree lower than 300 is used, the inherent physical properties of the vinyl chloride polymer are lowered.

Any vinyl chloride polymers prepared by emulsion polymerization, suspension polymerization or bulk polymerization may be used in the present invention.

The numerical relationship among the average polymerization degree, Fikentscher K-value and average molecular weight of vinyl chloride polymers is as shown in Table 1, below.

TABLE 1

| Average polymerization degree of vinyl chloride polymer | Fikentscher K-value | Average molecular weight |
| --- | --- | --- |
| 300 | 46 | 18,800 |
| 400 | 49 | 25,000 |
| 500 | 52 | 31,300 |
| 700 | 58 | 43,800 |
| 800 | 60 | 50,000 |
| 1,000 | 65 | 62,500 |

The methyl methacrylate polymer used in the present invention should have a methyl methacrylate unit content of at least 40% by weight, and it includes a homopolymer of methyl methacrylate, a copolymer of methyl methacrylate with other vinyl monomer copolymerizable therewith and a mixture thereof.

The vinyl monomer copolymerizable with methyl methacrylate may be copolymerized in an amount of up to 60% by weight. Specific examples of the vinyl monomer are alkyl acrylates such as methyl acrylate, ethyl acrylate, butyl acrylate and 2-ethylhexyl acrylate, alkyl methacrylates such as ethyl methacrylate and butyl methacrylate, aromatic vinyl compounds such as styrene, α-methylstyrene and vinyltoluene, and vinylcyano compounds such as acrylonitrile and methacrylonitrile. These vinyl monomers may be used alone or in the form of a mixture of two or more thereof. If the amount of the monomer copolymerized with methyl methacrylate exceeds 60% by weight, the compatibility of the resulting copolymer with the vinyl chloride polymer composition used in the present invention is readily lowered and the physical properties and processability of the resulting vinyl chloride polymer resin composition are reduced.

Preferably, the methyl methacrylate polymer used in the present invention is a copolymer comprising 95 to 70% by weight of methyl methacrylate and 5 to 30% by weight of ethyl acrylate or butyl acrylate.

In the present invention, the methyl methacrylate polymer should have a reduced viscosity ($\eta sp/C$) of 0.1 to 2 l/g, preferably, 0.3 to 0.4 l/g, as measured at 25° C. with respect to a solution of 0.1 g of the polymer in 100 ml of chloroform. If the reduced viscosity ($\eta sp/C$) is lower than 0.1 l/g, it is difficult to attain the intended improvement of the processability. If the reduced viscosity exceeds 2 l/g, the melt viscosity of the resin composition formed by incorporating the methyl methacrylate polymer into the vinyl chloride polymer composition is too high and it is difficult to attain the good flowability intended in the present invention.

Any methyl methacrylate polymers prepared by emulsion polymerization, suspension polymerization and bulk polymerization may be used in the present invention.

The numerical relation between the reduced viscosity ($\eta sp/C$) and viscosity average molecular weight of the methyl methacrylate polymers used in the present invention is as shown in Table 2.

TABLE 2

| $\eta sp/C$ | Viscosity average molecular weight |
| --- | --- |
| 0.05 | 85,000 |
| 0.1 | 200,000 |
| 0.25 | 476,000 |
| 0.3 | 568,000 |
| 0.4 | 730,000 |
| 1.0 | 1,680,000 |
| 2.0 | 2,920,000 |
| 2.2 | 3,130,000 |

The viscosity average molecular weight is calculated according to the following Schulz formula:

$$\text{Viscosity average molecular weight} = \frac{(\eta) - 0.0095}{0.47 \times 10^{-6}}$$

In the above formula, the intrinsic viscosity $[\eta]$ is calculated according to the following formula:

$$\eta sp/C + 1 = \left(1 + \frac{[\eta]}{2.5}\right)^{2.5}$$

The vinyl chloride polymer resin composition of the present invention is formed by incorporating 0.1 to 30 parts by weight, preferably 1 to 10 parts by weight of the methyl methacrylate type polymer having a reduced viscosity ($\eta sp/C$) included within the above-mentioned range into 100 parts by weight of the above-mentioned vinyl chloride polymer composition. If the amount of the methyl methacrylate polymer is smaller than 0.1 part by weight, it is difficult to obtain a sufficient high-temperature elongation when vacuum forming the resulting resin composition and it is also difficult to obtain a molded article having an excellent cell uniformity and appearance when low-expansion molding is carried out. Thus, the intended effect of improving the processability would not be attained. If the amount of the methyl methacrylate polymer exceeds 30 parts by weight, increase of the melt viscosity of the resin composition is extreme and it becomes difficult to obtain the intended effect of improving the flowability.

If desired, in addition to additives such as a heat stabilizer, a light stabilizer, a lubricant and a filler, an impact modifier and a heat distortion temperature improver such as a chlorinated vinyl chloride polymer resin also may be added to the vinyl chloride polymer resin composition of the present invention according to need.

The present invention will now be described in detail with reference to the following examples that by no means limit the scope of the invention. In the examples and comparative examples, all of "parts" and "%" are by weight.

EXAMPLES 1 THROUGH 4 AND COMPARATIVE EXAMPLES 1 THROUGH 3

A reaction vessel equipped with a stirrer was charged with 250 parts of distilled water, 1 part of potassium oleate, 0.5 part of potassium persulfate and the amounts shown in Table 3 of monomers constituting a methyl methacrylate polymer and tert-dodecylmercaptan. Polymerization was carried out at 60° C. for 5 hours. The latex obtained by the reaction was coagulated, washed and then dried to obtain a methyl methacrylate polymer having a reduced viscosity as shown in Table 3.

The obtained methyl methacrylate polymer was added in an amount shown in Table 3 to a vinyl chloride polymer resin shown in Table 3. Furthermore, 3 parts of tribasic lead sulfate, 1 part of tribasic lead stearate, 1.5 parts of lead stearate and 1 part of calcium stearate were added to the polymer resin mixture. The resin composition was molded into a square plate specimen, having a size of 10 cm×10 cm×3 mm (thickness), by a 5-ounce injection molding machine. The flowability and injection moldability of the specimen were evaluated. The obtained results are shown in Table 3.

The flowability was evaluated based on the minimum injection pressure (short shot pressure) under which the mold was just filled with the resin.

The injection moldability was evaluated based on the degree of a meandering pattern, that is, so-called jetting, generated from the gate under an injection pressure corresponding to the short shot pressure plus 2 kg/cm$^2$.

were used in the amounts shown in Table 2, whereby a methyl methacrylate polymer having a reduced viscosity shown in Table 4 was obtained.

The obtained methyl methacrylate polymer was added in an amount shown in Table 4 to a vinyl chloride polymer resin having a degree of polymerization shown in Table 4. In addition, 10 parts of Metablen C-201 (registered trademark of a product supplied by Mitsubishi Rayon K.K.) as an impact modifier, 2 parts of dibutyltin mercaptide, 0.5 part of butyl stearate and 0.5 part of montanic acid wax were added to the mixture. The resulting composition was extruded into a sheet having a thickness of 3 mm by an extruder having a screw diameter of 40 mm. The flowability and vacuum

TABLE 3

| | | | Example 1 | Example 2 | Example 3 | Example 4 | Comparative Example 1 | Comparative Example 2 | Comparative Example 3 |
|---|---|---|---|---|---|---|---|---|---|
| Polyvinyl chloride (parts) | Polymerization degree of 400 | | 20 | — | 40 | 50 | 20 | — | 20 |
| | Polymerization degree of 500 | | — | 30 | — | — | — | — | — |
| | Polymerization degree of 1000 | | 80 | 70 | 60 | 50 | 80 | 100 | 80 |
| Methyl methacrylate polymer | Monomer composition | Methyl methacrylate (parts) | 90 | 95 | 80 | 90 | 90 | 95 | 90 |
| | | Ethyl acrylate (parts) | 10 | — | — | — | 10 | — | — |
| | | Butyl methacrylate (parts) | — | 5 | 20 | — | — | 5 | 10 |
| | | Styrene (parts) | — | — | — | 10 | — | — | — |
| | | Tert-decylmercaptan (parts) | 0.01 | 0.01 | 0.005 | 0.02 | 0.003 | 0.01 | 1 |
| Evaluation | Reduced viscosity ($\eta$sp/C) | | 0.4 | 0.4 | 1 | 0.25 | 2.2 | 0.4 | 0.05 |
| | Amount incorporated (parts) | | 2 | 1 | 1 | 3 | 3 | 3 | 3 |
| | Short shot pressure (kg/cm$^2$) | | 62 | 60 | 55 | 58 | 88 | 98 | 53 |
| | Jetting | | ⊚ | ⊚ | ⊚ | ⊙ | ⊙ | x | x |

Note
⊚ ... Good
x ... Bad

As is apparent from the results shown in Table 3, resin compositions falling within the scope of the present invention exhibit excellent flowability and injection moldability. In contrast, in the resin composition of Comparative Example 1, since the reduced viscosity of the methyl methacrylate polymer is too high, the short forming processability of the sheet were evaluated.

The flowability was evaluated based on the load on a motor of the extruder having a screw diameter of 40 mm. The vacuum forming processability was evaluated based on the elongation at break of the extruded sheet at 100° C.

TABLE 4

| | | | Example 5 | Example 6 | Example 7 | Example 8 | Example 9 | Comparative Example 4 | Comparative Example 5 | Comparative Example 6 |
|---|---|---|---|---|---|---|---|---|---|---|
| Vinyl chloride resin (parts) | Polymerization degree of 400 | | 100 | 20 | — | 50 | — | — | 20 | 80 |
| | Polymerization degree of 500 | | — | — | 30 | — | 40 | — | — | — |
| | Polymerization degree of 800 | | — | 80 | 70 | 50 | 60 | 100 | 80 | 20 |
| Methyl methacrylate polymer | Monomer composition | Methyl methacrylate (parts) | 90 | 85 | 95 | 90 | 85 | 90 | 90 | 85 |
| | | Ethyl methacrylate (parts) | 10 | 15 | — | — | — | 10 | 10 | 15 |
| | | Butyl acrylate (parts) | — | — | 5 | 10 | 15 | — | — | — |
| | | Tert-dodecylmercaptan (parts) | 0.01 | 0.01 | 0.01 | 0.02 | 0.03 | 0.01 | 1 | 0.02 |
| Evaluation | Reduced viscosity ($\eta$sp/C) | | 0.4 | 0.35 | 0.4 | 0.25 | 0.15 | 0.4 | 0.05 | 0.2 |
| | Amount incorporated (parts) | | 5 | 7 | 5 | 6 | 8 | 5 | 15 | 35 |
| | Motor load of 40 mm⌀ extruder (A) | | 6.5 | 7.3 | 7.5 | 6.7 | 7.5 | 21.5 | 8.7 | 16.8 |
| | Elongation at break (%) | | 730 | 820 | 700 | 750 | 650 | 700 | 250 | 650 | shot pressure must be high and continuous molding is difficult. Furthermore, in the composition of Comparative Example 2, the short shot pressure is high because a vinyl chloride polymer resin having an average polymerization degree of 1000 is used alone, and thus undesirable jetting is caused. In Comparative Example 3, undesirable jetting is caused because the reduced viscosity of the methyl methacrylate polymer is too low.

EXAMPLES 5 THROUGH 9 AND
COMPARATIVE EXAMPLES 4 THROUGH 6

Polymerization was carried out according to the same recipe as in Examples 1 through 4 except that monomers constituting a methyl methacrylate polymer As is apparent from the results shown in Table 4, for compositions falling within the scope of the present invention, the motor load is small at the extruding step and the flowability is excellent. In view of the elongation at break, these resin compositions have a good vacuum forming processability. In contrast, in Comparative Example 4, since the average polymerization degree of the vinyl chloride polymer resin is high, even if the methyl methacrylate polymer falling within the scope of the present invention is incorporated into this vinyl chloride polymer resin, the motor load is excessively large at the extruding step. In Comparative Example 5, since the reduced viscosity of the methyl methacrylate polymer is too low, a good vacuum forming processability cannot be attained. In Comparative Example 6, since the amount of the methyl methacrylate polymer incorporated is too large, the motor load of the extruder is extremely large.

EXAMPLES 10 THROUGH 13 AND COMPARATIVE EXAMPLES 7 AND 8

Polymerization was carried out according to the same recipe as in Examples 1 through 4 except that the kinds and amounts of the monomers constituting the methyl methacrylate polymer were changed as shown in Table 5, whereby a methyl methacrylate polymer having a reduced viscosity as shown in Table 5 was obtained.

The obtained methyl methacrylate polymer was incorporated into a vinyl chloride polymer resin having a polymerization degree shown in Table 3, 10 parts of Metablen C-201 (registered trademark of a product supplied by Mitsubishi Rayon K.K.), 2 parts of dibutyltin mercaptide, 0.5 part of butyl stearate and 0.5 part of montanic acid wax were added to the mixture. The resulting resin composition was treated by 8-inch test rolls, whereby the adaptability to the production of a thick film by calendering was evaluated.

In order to prepare a thick film, it is ordinarily necessary to broaden the space between rolls, and therefore, rotation of the roll bank becomes insufficient and flow marks become conspicuous. Moreover, since the pressure between rolls is reduced, removal of air becomes insufficient and air bubbles are readily included in the resulting sheet.

At the present test, the roll distance was maintained at 0.8 mm while the temperature was maintained at 190° C., and the rotation numbers of the front and back rolls were adjusted to 14 rotations per minute and 16 rotations per minute, respectively. The state of the roll bank and the state of formation of air bubbles in the obtained sheet were examined. The obtained results are shown in Table 5.

present invention can be used for the production of films, sheets and plates by the process including vacuum forming, the production of large-size injection molded articles for which a high flowability is required, or for the production of low-expanded thick extrudates by calendering.

I claim:

1. A vinyl chloride polymer resin composition having excellent processability and flowability, which comprises (a) 100 parts by weight of a vinyl chloride polymer composition selected from the group consisting of a homopolymer of vinyl chloride having an average polymerization degree of 400 to 500, and a polymer mixture consisting of 80 to 20% by weight of a homopolymer of vinyl chloride having an average polymerization degree of 400 to 500 and 20 to 80% by weight of a homopolymer of vinyl chloride having an average polymerization degree of 800 to 1000, and (b) 0.1 to 30 parts by weight of a methyl methacrylate polymer, exclusive of the graft-type methacrylate polymers, comprised of at least 40% by weight of methyl methacrylate units and having a reduced viscosity ($\eta$sp/C) of 0.1 to 2 l/g as measured at 25° C. with respect to a solution of 0.1 g of the polymer dissolved in 100 ml of chloroform.

2. A vinyl chloride polymer resin composition according to claim 1 wherein the vinyl chloride polymer composition (A) is comprised of a vinyl chloride homopolymer having an average polymerization degree of 400 to 500.

3. A vinyl chloride polymer resin composition according to claim 1 wherein the vinyl chloride polymer composition (A) is comprised of 20 to 80% by weight of a vinyl chloride homopolymer having an average polymerization degree of 400 to 500 and 80 to 20% by weight of a vinyl chloride homopolymer having an average polymerization degree of 800 to 1000.

4. A vinyl chloride polymer resin composition according to claim 1 wherein the methyl methacrylate polymer is comprised of 70 to 95% by weight of methyl methacrylate units and 5 to 30% by weight of units derived from ethyl acrylate or butyl acrylate.

TABLE 5

|  |  |  | Example 10 | Example 11 | Example 12 | Example 13 | Comparative Example 7 | Comparative Example 8 |
|---|---|---|---|---|---|---|---|---|
| Vinyl chloride resin (parts) | Polymerization degree of 400 |  | 100 | 20 | 30 | 50 | — | 20 |
|  | Polymerization degree of 800 |  | — | 80 | 70 | 50 | 100 | 80 |
| Methyl methacrylate polymer | Monomer composition | Methyl methacrylate (parts) | 90 | 85 | 95 | 90 | 90 | 90 |
|  |  | Ethyl methacrylate (parts) | 10 | 15 | 5 | 10 | 10 | 10 |
|  |  | Tert-dodecylmercaptan (parts) | 0.01 | 0.01 | 0.02 | 0.01 | 0.01 | 0.01 |
| Evaluation | Reduced viscosity ($\eta$sp/C) |  | 0.4 | 0.3 | 0.25 | 0.4 | 0.4 | 0.4 |
|  | Amount incorporated (parts) |  | 3 | 2 | 2 | 3 | 3 | 0.05 |
|  | State of roll bank |  | ⊚ | ⊚ | ⊚ | ⊚ | ⊚ | x |
|  | Air bubble formation in sheet |  | Not formed | Not formed | Not formed | Not formed | Conspicuous | Conspicuous |

Note
⊚... Pencil and smoothly rotated
x... Waving of bank

In Examples 10 through 13, the bank was pencil bank and rotated smoothly, and no air bubbles were found in the sheet. In Comparative Example 7, although the bank was smoothly rotated, removal of air was insufficient and many air bubbles were formed. In Comparative Example 8, the bank waved and a large quantity of air was enfolded, and a sheet having a good quality could not be obtained.

According to the present invention, by adopting the above-mentioned structure, there can be provided a vinyl chloride polymer resin composition excellent in processability and flowability. The composition of the 5. A vinyl chloride polymer resin composition according to claim 1 wherein the methyl methacrylate polymer has a reduced viscosity ($\eta$sp/C) of 0.3 to 0.4 l/g.

6. A vinyl chloride polymer resin composition according to claim 1 wherein the amount of the methyl methacrylate polymer is 1 to 10% by weight based on 100 parts by weight of the vinyl chloride polymer composition (A).

* * * * *